May 10, 1932.   E. E. EDENHARDER   1,857,444
MACHINE FOR WASHING VEGETABLES
Filed Dec. 7, 1927
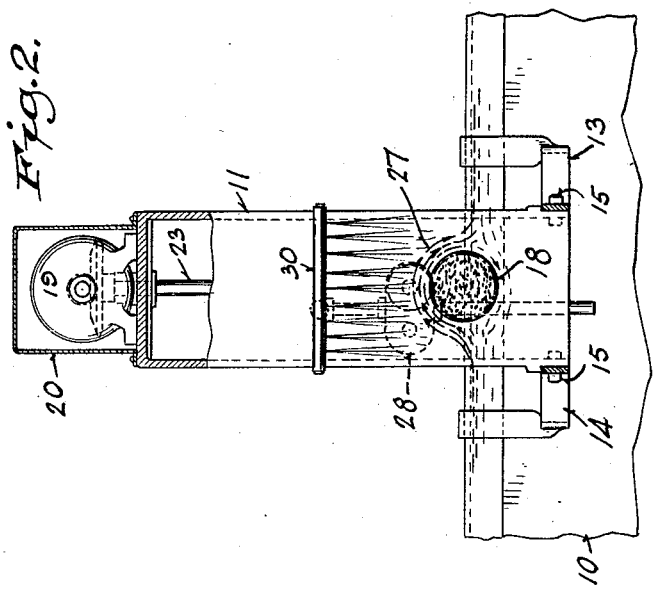
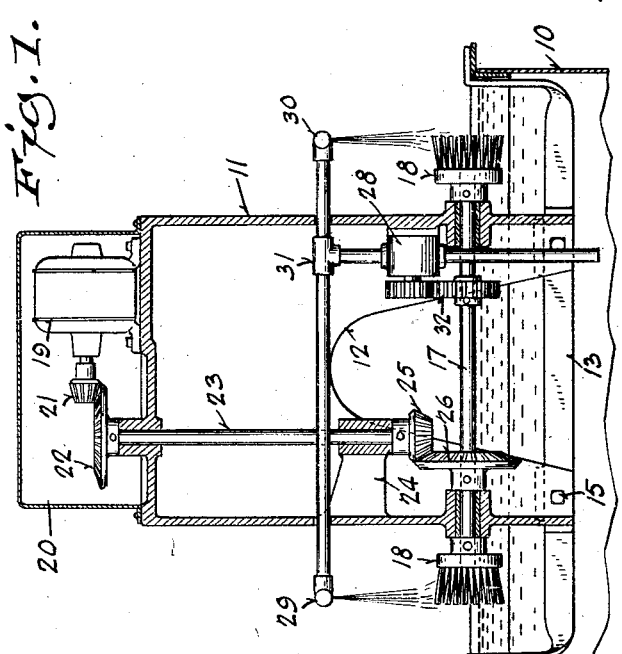
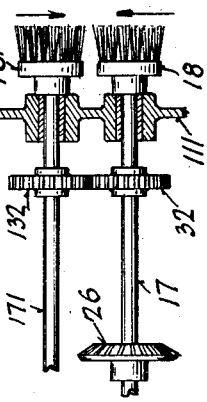
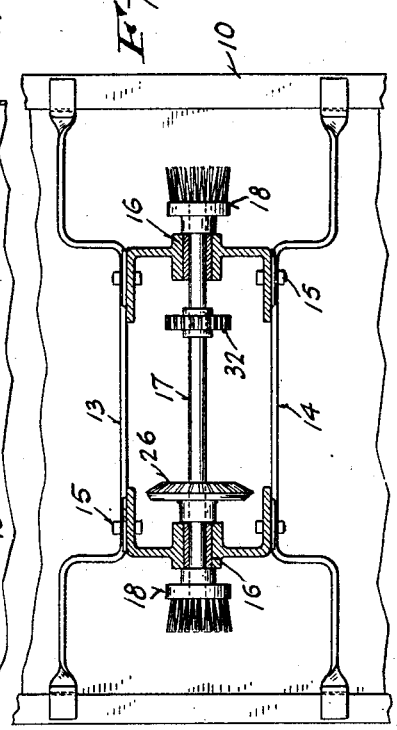
WITNESS:
INVENTOR.
EUGENE E. EDENHARDER
BY
ATTORNEYS.

Patented May 10, 1932

1,857,444

UNITED STATES PATENT OFFICE

EUGENE E. EDENHARDER, OF WEST ALLIS, WISCONSIN, ASSIGNOR OF ONE-THIRD TO HELEN E. EDENHARDER AND ONE-THIRD TO JACOB E. EDENHARDER

MACHINE FOR WASHING VEGETABLES

Application filed December 7, 1927. Serial No. 238,394.

My invention relates to machines for washing vegetables, either singly or in bunches, to free them from the soil adhering when garnered, so that they will present a clean and attractive appearance, free from dirt.

The object of my invention is to provide a machine for this purpose, simple in construction, efficient in operation, and economical as to cost of construction and operation.

The invention resides in a novel arrangement of the rotating scrubbing brushes, whereby the scrubbing faces of the brushes are caused to revolve in planes transverse to the axes of the brushes. In this respect, my new machine differs from the known machines in which the long cylindrical brushes revolve about their axes.

The invention comprises, in its simplest form, a frame-work adapted to be placed in the top of an open tank containing water, such frame-work being provided with journals in which are mounted for rotation a shaft carrying at its ends circular brush heads, the bristles of which extend in horizontal relation to the shaft, so as to present scrubbing faces standing in planes transverse to the axis of the shaft. Such an arrangement of the brushes doubles the capacity of the machine, inasmuch as the vegetables may be washed at opposite sides of the tank at the same time.

The invention comprises further a novel driving mechanism, in which an electric motor is used for power purposes. The motor is incased so as to protect it from the splash or spray of the water, and the motion of the motor is transmitted to the brush carrying shaft by means of gearing, thus avoiding the use of chains and belts, which latter when used act to convey a considerable amount of moisture from the tank to the motor, to the injury of the latter.

The scrubbing brushes are partly submerged, and in their rotation they produce a screen or veil of water, which extends radially of the exposed portion of the brushes, completely enveloping the faces of the latter, so as to provide a constant flow of water over the vegetables during the time that they are being washed.

I have provided also a pump which serves to add to the quantity of water momentarily suspended in the air by the action of the brushes. But this last structural feature is an optional one, and not necessary to the successful operation of my invention.

Having thus outlined the nature of my invention, I will now proceed to describe the same in detail, and will point out the novelty thereof in the appended claims.

In the accompanying drawings:

Figure 1 is a vertical sectional view transversely of the tank in a plane parallel to the axis of the brush carrying shaft, showing the construction of my invention, some of the parts illustrated being shown in elevation.

Fig. 2 is a view in elevation from the right of Fig. 1, the motor casing and part of the frame-work being shown in section.

Fig. 3 is a plan view, partly sectioned, in the plane of the brush carrying shaft.

Fig. 4 is a partial view in the same plane, showing parallel brush carrying shafts, whereby a widened scrubbing surface is secured.

In the drawings, the numeral 10 indicates a tank which is built to maintain a water level near its open top.

The numeral 11 designates a frame or housing of special construction, closed at its top and open at its bottom. In the construction shown, the frame 11 is rectangular on a horizontal line, and its two longer opposite sides may be cut away for a portion of their height as indicated at 12, to give easy access to the operating mechanism.

Two bridge pieces 13 and 14, which may be straight, or bent to the form shown, are adapted to rest at their ends on the top of the opposite side walls of the tank, and support the frame 11, the attachment of the frame to the bridge pieces being effected through bolts 15. The structure thus assembled is portable, and may be arranged as desired in the length of the tank, to permit the placement of other like machines in the tank. The shorter sides of the frame are provided with aligned bushed bearings 16, in which a brush carrying shaft 17 is journaled for rotation. The water level in the tank will just about reach the shaft 17. Each end of the shaft extending slightly beyond the frame 11, is provided with a circular brush 18, the head of which is connected to the shaft so as to rotate therewith. The flat faces of the brushes stand in planes which are transverse to the axis of the shaft carrying the brushes. In such an arrangement, the brushes are partly submerged in the water contained in the tank.

A motor 19 is mounted on the top of the frame 11, and is enclosed by a casing 20, to exclude moisture. The motor shaft is provided with a reducing pinion 21, engaging a bevel gear 22 at the upper end of a vertically arranged shaft 23. The shaft 23 is mounted for rotation in a bearing in the top of the frame and an aligned bearing on an arm 24, extending inwardly from one of the sides of the frame. At its lower end, the shaft 23 carries a reducing pinion 25, engaging a bevel gear 26, suitably attached upon the shaft 17. The arrangement of the connections just described, permits the shaft 17 and the brushes thereon to be rotated at a suitable speed, for the purposes of the invention. By omitting chains or belts between the motor and the brush carrying shaft, and driving directly through the gearing connections described, I eliminate the carrying of moisture from the tank to the motor, and thus prevent damage to the latter.

While in rotation, the exposed parts of the brushes 18 act centrifugally with respect to the water saturating them, projecting the water a few inches from the brushes, so as to envelop the latter in a screen or veil of water, indicated at 27, in Fig. 2, and which is maintained by the momentary suspension of the water in the air. This produces a shower which falls constantly over the scrubbing faces of the brushes, and falling over the vegetables which are held against the flat faces of the brushes, producing a more thorough cleaning of the vegetables, and greatly lessening the time required for such operation. Without the creation of the water saturated region of air about the brushes, the washing action would be dependent upon the water absorbed by the brushes, and the scrubbing action would not be so quickly performed.

As a part of my invention, I contemplate the installation of a pump 28, to draw water from the tank and distribute it through elongated nozzles 29 and 30, at the ends of the discharge connection 31 of the pump. The pump is driven from a gear 32 fixed on the shaft 17. The pump thus augments the supply of water thrown into the air by the rotating brushes, and insures a constant flow of water over the vegetables, whereby the washing action is accomplished with greater facility.

The arrangement of a scrubbing brush 18 at each end of the shaft 17, doubles the capacity of the machine, inasmuch as two persons can operate in connection with each of the machines installed in the tank.

In some instances, it is desirable to increase the effective area of the scrubbing surface of the brushes. This may be done without enlarging the diameter of the circular brush head, as to do so would increase the peripheral speed of the latter, with an undesirable distribution of the water. I attain the desired result by a mere duplication of the brush, mounting the second brush 181 on a shaft 171, parallel with the shaft 17, the shaft 171 and its brush being driven by a gear 132, meshing with the gear 32. The frame 111 will be proportioned to accommodate the changed construction. The brushes 18 and 181, rotating in opposite directions, as indicated by the arrows in Fig. 4, should be spaced sufficiently to prevent injury to the hand of the operator, should it be caught between the heads thereof.

The tank 10 is provided with an outlet, which may be opened at the close of the day, to exhaust the water and permit flushing to clear the tank of sediment.

Having thus described my invention, what I claim and desire to secure by Letters Patent of the United States, is:

1. In a vegetable washing machine, a frame adapted to be supported on a liquid containing tank, a shaft journaled in the frame and projecting at its ends therefrom, means for rotating the shaft, and scrubbing brushes attached to the projecting ends of the shaft, the scrubbing faces of the said brushes standing in planes transverse to the axis of the shaft and operating in the liquid in the tank when the frame is positioned thereover, whereby a scrubbing action may be performed at each side of the tank.

2. In a vegetable washing machine, a portable frame adapted to be supported on a liquid containing tank and partly entered therein, a shaft journaled in the frame and projecting at its opposite ends therefrom, means for imparting rotation to the shaft, and partly submergible circular brush heads carried by the projecting ends of the shaft, with the scrubbing faces of the brushes standing in planes transverse to the axis of the shaft, whereby scrubbing operations may be performed at both ends of the shaft and at opposite sides of the tank.

3. A portable vegetable washing machine comprising a frame adapted to be mounted over a liquid containing tank and partly entered therein, a shaft journaled in the frame and having at its end a brush extending axially thereof and adapted to be partially submerged in the tank, the scrubbing face of the brush standing in a plane transverse to the axis of the shaft, means for rotating the shaft, a pump supported in the frame and adapted to discharge water over the face of the brush, and connections for driving the pump from the brush carrying shaft.

4. In a vegetable washing machine, a frame adapted to be supported over a liquid containing tank and partly entered therein, parallel brush carrying shafts journaled in the frame, means for driving the said shafts whereby they are rotated in opposite directions, and brushes on the ends of the shafts outside of the frame, the faces of the brushes standing in planes transverse to the axes of the shafts on which they are mounted.

In testimony whereof, I have signed my name at Milwaukee, this 26th day of November, 1927.

EUGENE E. EDENHARDER.